United States Patent [19]

Jones

[11] Patent Number: 4,631,132
[45] Date of Patent: Dec. 23, 1986

[54] WASTEWATER FLOCCULATING AGENT

[75] Inventor: Larry D. Jones, Simpsonville, S.C.

[73] Assignee: National Starch and Chemical Corporation, Bridgewater, N.J.

[21] Appl. No.: 757,215

[22] Filed: Jul. 19, 1985

[51] Int. Cl.$^4$ ............................................. C02F 1/54
[52] U.S. Cl. ..................................... 210/727; 210/729
[58] Field of Search ............... 210/725, 727, 728, 729, 210/735; 260/404, 404.5, 404.5 PA

[56] References Cited

U.S. PATENT DOCUMENTS

| | | | |
|---|---|---|---|
| 2,340,881 | 2/1944 | Kelley et al. | 260/404.5 PA |
| 2,765,325 | 10/1956 | Niederhauser | 260/404.5 PA |
| 2,862,880 | 12/1958 | Clemens | 210/728 |
| 3,160,586 | 12/1964 | Duke | 210/738 |
| 3,165,465 | 1/1965 | Ray et al. | 210/727 |
| 3,377,274 | 4/1968 | Burke et al. | 210/727 |
| 3,617,568 | 11/1971 | Ries, Jr. | 210/53 |
| 3,734,873 | 5/1973 | Anderson et al. | 210/734 |
| 3,963,637 | 6/1976 | Chapell | 252/181 |
| 4,342,653 | 8/1982 | Halverson | 210/734 |

FOREIGN PATENT DOCUMENTS

| | | | |
|---|---|---|---|
| 261662 | 2/1963 | Australia | 210/735 |
| 139923 | 6/1976 | Japan | 210/726 |

OTHER PUBLICATIONS

*The Condensed Chemical Dictionary*, Van Nostrand Reinhold Company, 1971, p. 421.
Buisson, "*Treatment of Rubber Latex Wastes*", Chemistry Div., Dept. of Scientific and Industrial Research, New Zealand, Report C.D. 2250, 31 pages, (Mar. 1977).

*Primary Examiner*—Peter Hruskoci
*Attorney, Agent, or Firm*—Edwin M. Szala; Ellen T. Dec

[57] ABSTRACT

A process for treating wastewater which contains an undesirable level of suspended organic solids which process employs a non-polymeric, cationic flocculating agent comprising a salt of a fatty acid aminoalkyl alkanolamide.

11 Claims, No Drawings

WASTEWATER FLOCCULATING AGENT

BACKGROUND OF THE INVENTION

This invention relates to a wastewater flocculating agent and its use in treating wastewater which contains an undesirable level of suspended organic materials. In a further aspect, the invention relates to a process for treating wastewater, such as is obtained in connection with polymerization processes and chemical compounding, with an organic non-polymeric cationic flocculating agent. Advantageously, the flocculating agent of the invention is biodegradable.

Large amounts of wastewater are generated in connection with the running of chemical plants where chemical compounding and latex polymerization processes, for example, are carried out on a daily basis. Such wastewater is loaded with suspended and dissolved organic materials including mixed polymer latex wastes and also including various ionic and non-ionic organic surfactants at solids concentrations typically ranging from 0.05 to 5 weight percent. Based on ecological considerations, disposal of such untreated wastewater by downstream dumping or draining in leach fields is undesirable and often restricted or prohibited by statute.

It is well known that treatment of turbid waters and such wastewaters described above involves precipitation and coagulation with subsequent flocculation whereby very minute particles and particles in colloidal form are coalesced into various dimensioned flocks which are thereafter separated by flotation, precipitation or sedimentation. A variety of processes are known for the primary treatment of such wastewaters. A representative process of the prior art comprises the precipitating, coagulation and flocculation of the solids therein by chemical means and thereafter subjecting the wastewater to a step of dissolved air flotation so as to float the sludge formed of the coagulated particles to the surface. The sludge is separated from the liquid by mechanical means and is thereafter buried while the treated wastewater is disposed of by spray irrigation in slow rate land treatment of leach fields. Alternatively, the flocculated sludge can be separated from the wastewater by know settling procedures. Lime, hydrated calcium oxide, in conjunction with ferric chloride; ferric sulfate, or alum is commonly used to precipitate and coagulate the contaminant suspended solids. In other processes, ferric chloride is used in conjunction with sodium hydroxide.

It is known that many wastewater treatment processes utilize polymeric flocculants comprising cationic, anionic and non-ionic polymers which are often added during the primary treatment of the wastewater to further aid in the flocculation of solids by lowering the charge of the contaminant particles as well as causing interparticle bridging, thereby increasing the size of the particle aggregates. Typically, a cationic polymer is added to the wastewater in amounts from about 50 to 800 ppm followed by the addition of an anionic polymer in amounts of from about 10 to 100 ppm.

A variety of wastewater treatment cationic polymers for enlarging and concentrating (compacting) the flocculated solids during the primary precipitation and coagulation is available commercially. Ordinarily such polymers are synthetic, high molecular weight polyelectrolytes, such, for example, as substituted polyacrylamide and polyquarternary amines. Commercially available cationic polymers include American Cyanamid 581C and 591C, and Primafloc C-3 supplied by Rohm and Haas. It is an advantage of the flocculating agents of the present invention that they promote flocculation of the wastewater suspended matter as effectively as the known conventional polymeric flocculating agents yet because of their non-polymeric fatty acid based chemical structure are biodegradable and also are less expensive than conventional, commercially available polymeric cationic flocculating agents.

SUMMARY OF THE INVENTION

In accordance with the present invention a process for treating wastewater is provided which comprises the step of adding to the wastewater, subsequent to precipitation and coagulation of the suspended solids, an effective amount of a non-polymeric, cationic flocculating agent wherein the flocculating agent is a salt of a fatty acid aminoalkyl alkanolamide, obtained by the reaction of a fatty acid with an aminoalkyl alkanol amine, of the following general structure:

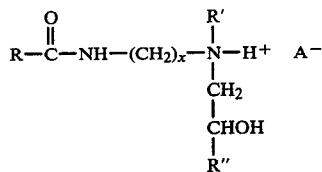

wherein R is a carbon chain of a fatty acid having from 14–22 carbon atoms
R' is H, $C_1$–$C_6$ alkyl group,
R" is H, or $CH_3$,
x is an integer of 1–6, and A is an anion.

It is likely that when a excess of fatty acid is used in the preparation of the intermediate, an additional fatty acid molecule with its carboxyl functionality will attach to the basic nitrogen thereby forming a diamide. It is believed, however, that the monofatty acid compound as shown in the above structure forms the major portion of the flocculating agent. For the purposes of this invention any diamide formed in the reaction of the fatty acid with the aminoalkyl alkanol amine is considered functionally equivalent to the compounds of the above general structure.

The flocculation agent of the present invention is ordinarily prepared into a fluid paste emulsion which is readily soluble in cold water (60° to 80° F.) and provides further flocculation where prior chemical treatment of the wastewater has earlier provided precipitation and or coagulation and some degree of flocculation. Thus it is contemplated that the step of adding the flocculating agent to the wastewater in accordance with process of the invention can be utilized in conjunction with a variety of prior art wastewater treatment processes. The flocculating agent of the invention can therefore be advantageously employed in partial or full replacement of known polymeric cationic flocculants wherein such use of known cationic flocculants is warranted.

In a process representative of the wastewater treatment process of the present invention, the process comprises the following steps:
 a. the wastewater is chemically treated to coagulate and precipitate the suspended solids,
 b. addition of cationic flocculating agent of the present invention, c. addition of polymeric anionic flocculating agent,
d. settling or flotation of flocculated solids,
e. separation and removal of flocculated solids from the treated wastewater, and
f. disposal of the treated wastewater in slow rate load treatment or leach fields.

The cationic flocculating agent (i.e., the fatty acid aminoalkyl alkanol amide salt) is used in the process in an effective amount which will range from about 50 to 800 ppm. Ordinarily, the concentration of cationic flocculating agent will range from 100 to 500 ppm. Use of the cationic agent alone is ineffective in providing acceptable flocculation, and an anionic flocculating agent must also be added to fully flocculate the precipitated, coagulated solids. Any anionic flocculating agents such as are known and conventionally employed as flocculants may be used in the process herein. Commercially available anionic polymers include Hydraid 771 supplied by Calgon Co. and Hercufloc 1031 supplied by Hercules, Inc. The anionic polymer is added in amounts up to about 100 ppm, preferably from 10 to 60 ppm. While the preferred addition with respect to the cationic and anionic flocculants is as given above, the reverse order is also effective. Thus the order of addition and specific concentration levels of the flocculants can best be decided by the practitioner.

DETAILED DESCRIPTION OF THE INVENTION

The preparation of the cationic flocculating agents of the present invention can be carried out by chemical reactions well known to a practitioner in the art. As starting materials, useful fatty acids are those having from 14-22 carbon atoms and include, for example, myristic, palmitic, stearic, arachidic, behenic and mixtures of such acids. As to the compound to be reacted with the fatty acid, a variety of compounds having both amino and alcoholic functional groups can be used. Illustrative of such compounds are N-methylaminoethylethanolamine, aminoethylethanolamine, aminopropylethanolamine, N-methyl, 2-aminoethyl, N'-methyl, ethanolamine, aminohexylethanolamine, aminoethylpropanolamine, aminopropylpropanolamine and aminohexylpropanolamine. Thus, useful reactants will be either an aminoalkyl substituted ethanol or propanol amine where the alkyl group will contain from 1-6 carbon atoms. Use of the aminoethyl ethanol amine reactant is preferred. The reactants are used on a mole to mole basis but an excess of the fatty acid over the aminoalkylalkanol amine, up to about 40-50 mole percent, is permissible.

In reacting the aminoalkylalkanol amine with the fatty acid, a catalyst such as, for example, 2-hydroxyethyl-trimethylammonium bicarbonate or tetramethylammonium chloride, as is well known, may be used. Completion of the reaction is monitored by the acid number of the resultant product. Ordinarily the reaction is considered completed when the product exhibits an acid no. of from 4-12.

In preparing the resultant intermediate in form for use in accordance with present invention, the intermediate is ordinarily converted to an aqueous emulsion with about 25% solids, although a solids content of from about 10 to 60% or more is acceptable. A stoichiometric amount of an acid is added to the water employed in preparing the emulsion. The acid employed is not critical and may be a carboxylic acid such as, for example, formic, acetic, lactic acid, etc,. or it may be a common acid such as, for example, hydrochloric or sulfuric acids. The selection by the practitioner is based on cost and ecological considerations.

Optionally, a compound which may serve as a non-reactive, compatible extender and/or thickener for viscosity control can be added to the intermediate prior to or after the formation of the salt. Useful representative compounds of this type include glycerol monostearate and ethyleneglycol monostearate. Such extenders can be added in amounts from about 5-20% by weight, based on the weight of fatty acid employed.

EXAMPLE I (Preparation of the flocculating agent)

Stearic acid (714 parts) was charged into a distillation vessel and melted. Aminoethylethanol amine (188.5 parts) was added with mixing to the melted fatty acid maintaining a temperature below 250° F. To this mixture, 2-hydroxyethyl-trimethylammonium bicarbonate (1.8 parts) was added. The vessel was closed and the temperature slowly raised until the distillation started (275°–285° F.). About one-half hour after the start of distillation, the batch temperature was increased to 325° F. and held at that temperature for two hours. The temperature was maintained at 325° F. for about an additional hour when an acid no. within the range of 4–12 was reached.

Cooling of the vessel was started and addition of glycerol monostearate (95.7 parts) was initiated when the vessel temperature reached 250° F. Agitation was continued at 220°–225° F. until all the glycerol monostearate was melted. The intermediate was then held in molten form for conversion into the final emulsion paste.

In another mixing vessel, water (708.7 parts) was charged and heated to 185° F. and acetic acid, 84% concentration, (35.7 parts) was gently mixed into the heated water. About 255.6 parts of the base intermediate prepared above were added with moderate agitation to the heated water while the temperature was maintained between 185° and 195° F. Mixing was continued for about 1 hour until a smooth, lump-free emulsion was obtained. The vessel was cooled and agitation was reduced on breaking of the viscosity. The resultant emulsion was transferred to containers for storage and use or shipping. The pH of a 2% solution of the flocculating agent fell between 4 and 6.

EXAMPLE II

In repeating the procedure of Example I, an equivalent amount of a mixture of stearic acid and palmitic acid (approximately 1:1 ratio) is used in place of the stearic acid. A product very similar to that of Example I is obtained.

EXAMPLE III

This example compares the effectiveness of the cationic flocculating agent of the present invention with two conventional polymeric cationic flocculating agents commercially available.

Wastewater taken from a wastewater storage basin of a chemical plant, containing about 4.0% solids, was treated with a lime slurry to a pH of 12.8 The pH of the lime treated water was thereafter adjusted with phosphoric acid to a pH of 9.9. A five gallon sample of this water was taken for use in the following jar tests.

Three trials were run where in each case a 500 ml. sample of the coagulated, precipitated wastewater described above was further treated with 400 ppm of the flocculating agent of the present invention (the product of Example I), designated sample A, or with 400 ppm. of American Cyanamid's 581C or with 400 ppm of Mantalex 12 supplied by Mantek, Inc. The latter two samples were designated samples "B" and "C", respectively.

After addition of the cationic agent, each sample was stirred for about 7-8 minutes, and thereafter a dilute solution of an anionic polymer (Hercufloc 1031) was added to produce a concentration of about 40 ppm. Stirring was continued for an additional 1 to 2 minutes. A coherent floc quickly settled to the bottom after stirring. The clarified water was poured off through a coarse filter and analyses were run on all samples. Results are summarized in Table I below.

TABLE I

| | Sample | | |
|---|---|---|---|
| | A | B | C |
| Total Kjeldahl Nitrogen (mg/l) | 105 | 90 | 125 |
| pH | 9.5 | 9.4 | 9.4 |
| Total Solids (% by weight) | 1.02 | 0.53 | 1.02 |
| Conductivity (mg/l) | 4150 | 4150 | 4000 |
| Chemical Oxygen Demand (mg/l) | 17,120 | 8,160 | 19,360 |

The above results indicate that the flocculating agent of the present invention to provide an effective flocculation of precipitated wastewater comparable to that achieved with two conventional, polymeric flocculating agents.

In summary, the present invention is seen to provide a process for treating wastewater containing an undesirable level of organic matter wherein the coagulated solids are flocculated by treatment with a non-polymeric, cationic flocculating agent comprising a salt of a fatty acid aminoalkyl alkanolamide followed by treatment with an anionic polymeric flocculating agent.

Now that the preferred embodiments have been described in detail, various modifications and improvements thereon will become readily apparent to those skilled in the art. Accordingly, the spirit and scope of the present invention are to be limited only by the appended claims, and not by the foregoing specification.

What is claimed is:

1. A process for treating wastewater containing an undesired level of suspended organic solids comprising polymeric latex wastes that have been precipitated and coagulated by the addition of an effective amount of lime and phosphoric acid, which comprises (a) adding to the wastewater, subsequent to precipitation and coagulation of said solids, an effective amount of a non-polymeric, cationic flocculating agent comprising a salt of a fatty acid aminoalkyl alkanolamide of the following general structure:

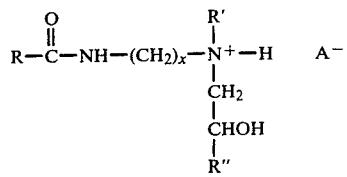

wherein R is a carbon chain of a fatty acid having from 14-22 carbon atoms,
R' is H, or $C_1$-$C_6$ alkyl group,
R" is H, or $CH_3$,
x is an integer of 1-6, and A is an anion,
(b) adding to the wastewater an effective amount of an anionic polymeric flocculant, thereby enhancing the flocculation of said precipitated and coagulated solids and thereafter (c) separating the flocculated solids from the water.

2. The process of claim 1 wherein R is a carbon chain of stearic acid or a mixture of stearic and palmitic acids.

3. The process of claim 2 wherein the cationic flocculating agent is employed in an amount from 100 to 500 ppm.

4. The process of claim 1 wherein R' and R" are hydrogen, and x is 2.

5. The process of claim 4 where A is an anion of acetic acid.

6. The process of claim 1 wherein the cationic flocculating agent is in aqueous emulsion form.

7. The process of claim 1 wherein the cationic flocculating agent comprises a non-reactive, compatible extender selected from the group consisting of glycerol monostearate and ethylene glycol monostearate.

8. The process of claim 7 wherein the non-reactive, compatible extender is glycerol monostearate employed in an amount of from about 5-20% by weight based on the weight of fatty acid employed.

9. The process of claim 1 wherein the cationic flocculating agent is employed in an amount from about 50 to 800 ppm and the anionic flocculant is employed in an amount from 10 to 100 ppm.

10. A process for treating wastewater containing an undesired level of suspended organic solids comprising polymeric latex wastes that have been precipitated and coagulated by the addition of an effective amount of lime and phosphoric acid, which comprises (a) adding to the wastewater, subsequent to precipitation and coagulation of said solids, an effective amount of a non-polymeric cationic flocculating agent in aqueous emulsion form comprising a salt of a fatty acid aminoalkyl alkanolamide of the following general structure:

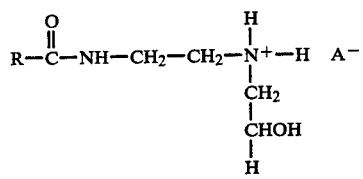

wherein R is a carbon chain of stearic acid or a mixture of stearic and palmitic acid, and A is an anion, (b) adding to the wastewater an effective amount of an anionic polymeric flocculant, thereby enhancing the flocculation of said precipitated and coagulated solids and thereafter (c) separating the flocculated solids from the water.

11. The process of claim 10 wherein the cationic flocculating agent comprises a non-reactive compatible extender selected from the group consisting of glycerol monostearate and ethylene glycol monostearate.

* * * * *